(No Model.)
2 Sheets—Sheet 1.
I. N. LEWIS.
RANGE AND POSITION FINDER.
No. 600,084. Patented Mar. 1, 1898.
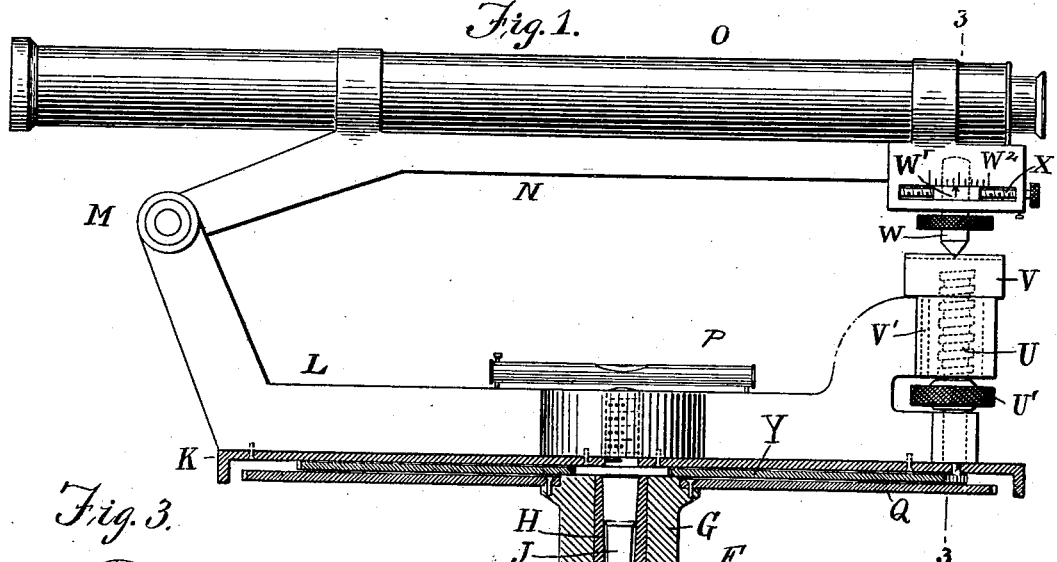
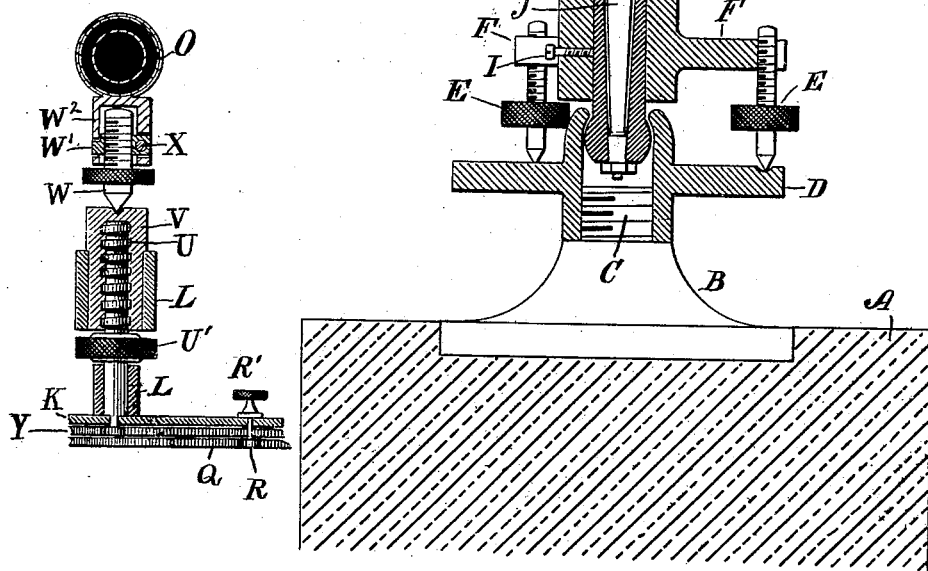
WITNESSES:
C. L. Belcher
J. N. Capel.
INVENTOR
Isaac N. Lewis
BY
H. C. Townsend
ATTORNEY (No Model.)  I. N. LEWIS.  2 Sheets—Sheet 2.
RANGE AND POSITION FINDER.

No. 600,084.  Patented Mar. 1, 1898.

WITNESSES:
C. L. Belcher
Wm. H. Capel.

INVENTOR
Isaac N. Lewis
BY
H. C. Townsend
ATTORNEY

UNITED STATES PATENT OFFICE.

ISAAC N. LEWIS, OF FORT WADSWORTH, NEW YORK, ASSIGNOR TO THE DRIGGS-SEABURY GUN AND AMMUNITION COMPANY, OF NEW JERSEY.

RANGE AND POSITION FINDER.

SPECIFICATION forming part of Letters Patent No. 600,084, dated March 1, 1898.

Application filed January 26, 1897. Serial No. 620,826. (No model.)

*To all whom it may concern:*

Be it known that I, ISAAC N. LEWIS, a citizen of the United States, and a resident of Fort Wadsworth, in the county of Richmond and State of New York, have invented a certain new and useful Range and Position Finder, of which the following is a specification.

This invention relates to range and position finders intended for use in coast defense. It particularly relates to that class of these instruments which operate upon a vertical base and to certain essential improvements upon the instrument which forms the subject of United States Letters Patent No. 447,335, granted March 3, 1891.

Range and position finders of this class are particularly well adapted for coast defense, since by one of these instruments a single operator can accurately and immediately locate an object at sea and readily follow its course, the instrument being so constructed and provided with quick-reading devices that the successive positions of such object may be read at a glance.

One object of this invention is to construct quick-reading devices for this class of instruments which will dispense with verniers, give more accurate readings, and which may be read in much less time.

Another object of the invention is to so construct said quick-reading devices and so associate them with the other parts of the range and position finder that they will be actuated in the routine operation of the instrument and show the absolute position of the object the instant the instrument is brought to rest.

Another object of the invention is to simplify in every detail the parts of the instrument shown in the aforesaid patent.

With these objects in view the invention consists in the construction, combination, and arrangement of parts hereinafter fully described, and set forth in the claims.

Figure 5:
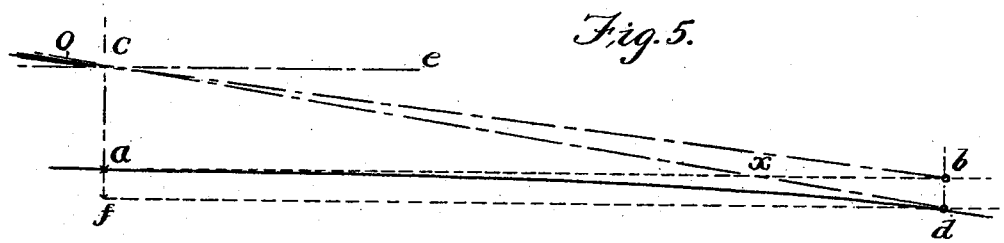
Figure 2:
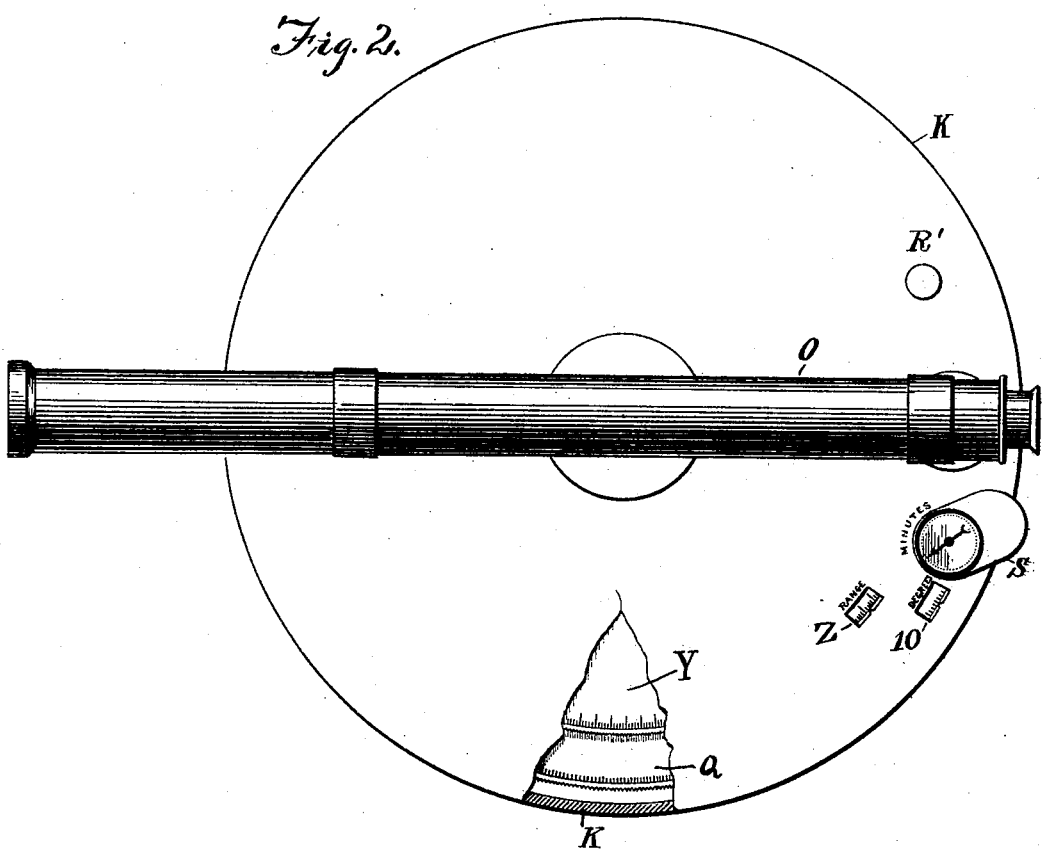
Figure 4:
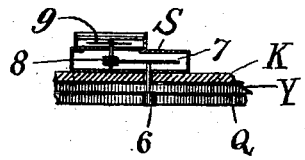

In the accompanying drawings, which form a part of this specification, Figure 1 is a partially-sectionized side elevation of a range and position finder embodying this invention. Fig. 2 is a plan of the same. Fig. 3 is a vertical section taken in the plane represented by line 3 3, Fig. 1. Fig. 4 is a vertical section through the quick-reading azimuth device. Fig. 5 is a diagram explaining the problem of obtaining the range of an object by a range-finder operating on a vertical base.

Before proceeding to a detailed description of this instrument and its operation it is deemed best to call attention to the fact that in range-finders having a vertical base the location of an object is always a problem in right-angle triangulation. The height of the pivotal point of the instrument's telescope above sea-level is the base of triangulation for all azimuths taken from that position of the instrument and it is the vertical of the right-angle triangle of every range observation. The range of the object observed is the horizontal of said triangle. The line of collimation of the instrument when establishing the range of an object is the hypotenuse of the triangle, and the angle between this and the horizontal is the angle of depression through which the telescope of the instrument is moved in directing it upon the object.

In another application filed by me of even date herewith, Serial No. 620,825, there is shown and described a range and position finder intended for use at a fixed location. The instrument which forms the subject of this application is more especially designed for transportation from one place to another and may be used in conjunction with the one forming the subject of the aforesaid application.

To this end the instrument here shown is of as light construction as practicable and is provided with means for attaching it to bases or pedestals erected in different localities. One form of such base is illustrated in Fig. 1, wherein A represents a foundation of concrete or other suitable material, and B a pedestal secured therein. This pedestal may be provided with any suitable means for attaching the stand of the instrument thereto, the one shown consisting of a screw-threaded stud C. The lower end of said stand may consist of a plate or spider D, near the outer periphery of which suitable depressions may be made for the reception of leveling-screws E, which turn in arms F, formed upon the upper part of the stand G. In the center of the part G is located a cylindrical female center H, which is secured in place by any suitable means, as the set-screw I. This center has formed upon its lower end an enlargement which, with the contracted upper end of the center portions of plate D, constitutes a ball-and-socket joint by which the upper portion of the stand is allowed freedom of movement in all directions for the sake of adjustment. Through the female center H is passed the male center J, which has a flange at its upper end resting upon the top of the center H and a nut upon its lower end turned against the lower end of the center H. In this way all the parts of the stand are held together and yet allowance is made for the necessary adjustments. The upper end of the center J is screw-threaded and passes through the table K into the rib L, which is provided with a hub at its middle for the reception of said center and is secured in place diametrically across the table. This rib projects upwardly at the forward end and has pivoted thereto at M the telescope-support N, in which the telescope O is mounted in any suitable way, as by the bands shown. A spirit-level, as P, is mounted upon the rib L, and by turning the table so as to bring said rib successively over the different adjusting-screws of the stand the instrument may be accurately leveled.

Upon the stand there is secured a circular rack or toothed plate Q, with which meshes a pinion R, which may be rotated by any suitable means, as by a milled head R', located on the surface of the table K. By means of this screw the table may be moved for fine adjustment, but the rotation thereof for any considerable distance may be done by taking directly hold of the table.

By means of the parts just described the telescope may be moved in azimuth upon any object. Various means may be adopted for determining the azimuth of any object upon which the telescope is brought to bear. A quick-reading device for this purpose is preferred, one form of which is illustrated in Figs. 2 and 4. This device consists of the toothed plate Q; a pinion 6, which meshes with the toothed plate Q and is mounted upon a shaft located within the casing S, mounted upon the table K; the gear 7 on the upper end of said shaft; the pinion 8, with which gear 7 meshes; the pointer 9, mounted upon the shaft with pinion 8, and the dial, graduated to minutes of arc, over which the pointer moves. The degree-scale is marked upon the plate Q and appears through an opening in the table, as at 10. This circular plate Q serves as the motor-gear of the quick-reading device. When the table has been moved to bring the telescope into a particular direction, the azimuth of the object sighted may be read immediately in degrees and minutes from the indicator just described.

As above stated, the pivotal point of support for the telescope is at M. To raise and lower the eyepiece of the telescope, a screw, as U, is mounted in the rear end of the rib L and turned by means of the milled projection U'. Upon this screw, within an enlargement of the rear end of said rib, is located a nut, as V, which is capable of vertical movement in its support and is prevented from rotary movement by a suitable feather, (indicated in dotted lines at V'.) A slight groove is cut longitudinally of the upper surface of this nut, and in this groove rests the conical end of an adjusting-screw W, which is also provided with a milled projection for turning it. This screw turns through a nut W', mounted within a casing secured to the rear end of the support M. This casing is so constructed that a portion of the nut projects through a slot in the side thereof and bears a line pointing to the scale $W^2$, marked upon the outside of said casing. Provision is also made for movement of this nut longitudinally of the casing, and such movement is produced by means of the screw X, which is secured against longitudinal movement in the casing and provided with a milled head, as shown. These three screws U, W, and X provide for the vertical movement of the eyepiece of the telescope for special purposes hereinafter specified.

Any rotation of the screw U to move the telescope also actuates the range-scale Y, which consists of a circular toothed plate mounted to rotate upon the stand G between the table and the plate Q. The graduations of this scale show through an opening in the table K, as at Z.

Before detailing the operation of the instrument it may be well to refer to the diagram Fig. 5 and point out the difficulties in the way of a vertical-base range-finder and how this invention overcomes such difficulties.

Let the heavy short line O represent the telescope; $c$, its pivotal point; $a\,c$, the elevation of said point above mean low tide; $a\,b$, the apparent level of the water; $a\,d$, the true surface of the water, and $c\,e$ a horizontal line through the pivotal point of the telescope. Then were the telescope turned on an object at $b$ the line of collimation would be $c\,b$ and the right-angle triangle $c\,a\,b$. The angle of depression of the telescope would then be $e\,c\,b$, to which the angle $c\,b\,a$ is equal. Then knowing the latter angle the horizontal distance or range of the object at $b$ can be readily computed; but an object in the water at the distance $a\,b$ would, on account of the curvature of the earth, be at a point below $b$, as at $d$. To reach this object, a greater depression of the telescope is necessary; but in effecting this depression the line of collimation cuts the line $a\,b$, as at $x$, and in computing the range of the object from the new angle of depression $e\,c\,d$ and the base $a\,c$ an erroneous range $a\,x$ would be obtained. The distance of any point on the curve $a\,d$ below the tangent $a\,b$ is known, and an allowance on account thereof for each unit of range may be made on the range-scale Y in the construction of the machine, so that when an object is sighted, as at $d$, the true base for that range is the sum of the base $a\,c$ and the distance $b\,d$ which that object is below the tangent $a\,b$ or $c\,f$. The true range $f\,d$ is then readily obtainable. In making this correction for curvature of the earth account must be taken of refraction of the atmosphere, which has the effect of elevating the object above its true position. This effect under normal atmospheric conditions is found to be about one-seventh the effect of curvature. This correction for mean refraction being on account of a permanent condition for all ranges within the capacity of a certain instrument is in the construction of the instrument computed for each unit of range indicated upon the scale Y. There are still two corrections which must be made for variable conditions, such as the rise and fall of tides and abnormal refraction. These corrections must be made by adjustments in the instrument and will be brought out in describing the operation of the instrument.

After the instrument is placed upon its pedestal and leveled up the altitude of the pivoted center of the telescope above low mean tide is obtained from any suitable instrument. Then the screw X is rotated to place the point of screw W at such a position upon the nut V as will make the working base of the instrument or the vertical of the right-angle triangle for the observations from that station equal to the altitude of the instrument. Then when an observation is to be taken this working base is corrected for the condition of the tide by first obtaining the height of tide from any suitable tide-gage and then turning the screw X to place the screw W in alinement with that degree of scale $W^2$ which corresponds to the vertical base with the tide at the height observed, the scale $W^2$ having in the construction of the machine been plotted for the adjustment of altitude and correction for tide. This correction for tide shifts the telescope into position for all ranges within the scope of the instrument at that height of tide. Then correction must be made for abnormal refraction. To do this, the instrument may be set for the range of some known object, and if by turning it upon that object the horizontal cross-hair of the telescope does not coincide with the water-line thereof the eyepiece of the telescope must be raised or lowered until such coincidence is effected. This is done in the present instrument by turning the screw W. By using the screw W for this purpose the delicate micrometer adjustment ordinarily employed in the telescope itself for shifting the cross-hair may be dispensed with. The instrument having been corrected for tide and abnormal refraction the table is moved in azimuth, as above described, until the telescope points in the direction of the object whose range is to be determined. Then by turning the screw U the telescope may be tilted until its horizontal cross-hair coincides with the water-line of the object. The range may be then immediately read directly from the scale Y in yards and the azimuth read directly from the indicators 9 and 10 in degrees and minutes.

So rapidly can the parts of the instrument be manipulated that an object within the field of the instrument may be accurately located in less than ten seconds.

It will be noted that the direction or azimuth indicator is operated by the movement of the instrument by which an object is located and that the range is also indicated by such movement, so that as soon as the object is located the readings may be directly taken from the scales without correction or computation of any sort and without the use of verniers. It is also to be noted that the indicator for minutes of azimuth is operated through a train of multiplying-gear from the degree-scale.

Many changes may be made in the form, construction, and combination of parts of the instrument above described without departing from the spirit of the invention.

What I claim as my invention is—

1. In an azimuth instrument, the combination with a fixed circle graduated to degrees, of a quick-reading device wherein the smaller subdivisions of the circle are directly indicated by means of a train of multiplying-gearing in which said circle constitutes the motor-gear.

2. In a range and position finder, the combination with a telescope pivoted to move horizontally, a fixed scale concentric with the pivot and graduated to degrees, a minute-indicator movable with the telescope and taking motion from a fixed portion of the instrument as the telescope is moved horizontally.

3. In a position-finder, an azimuth-indicator consisting of a fixed dial-plate graduated to degrees, a minute-indicator movable about said plate, a hand or pointer, and means engaging with a fixed portion of the instrument for rotating the hand as the indicator is moved.

4. The combination with the rotary table carrying the telescope, of the fixed graduated dial under said table and provided with a toothed edge, a pinion meshing with said edge by which the table may be adjusted, and a minute-indicator mounted on the table and provided with an operating-gear in mesh with said dial.

5. In a range and position finder, the combination with the telescope, of a rotary range-scale, a vertically-movable nut under the eyepiece of the telescope, a screw-shaft for elevating said nut, and means actuated by said shaft for operating the range-scale at the same time the telescope is tilted.

6. In a range-finder, an adjustment device for abnormal refraction located between the telescope and the range-adjustment mechanism, and an indicator operated by the range-adjustment mechanism.

7. In a depression range-finder the combination with a telescope mounted to tilt in a vertical plane, mechanism for tilting the telescope to obtain the range of an object, means interposed between said mechanism and the telescope to make correction for abnormal refraction, and an indicator operated by said tilting mechanism.

8. The combination with a telescope pivoted to move in a vertical plane, of a vertically-movable nut as V, a screw for moving it, an indicator connected with the same and a vertically-movable screw connected to the telescope to correct for abnormal refraction and resting movable upon said nut.

9. The combination with a telescope mounted to tilt in a vertical plane, mechanism for vertically adjusting the eyepiece thereof, means interposed between said mechanism and the telescope for changing the base of triangulation, and a device acting independently of said means and mechanism to tilt the telescope and thereby make correction for abnormal refraction.

10. The combination with the telescope pivoted to move in a vertical plane, of a vertically-movable nut as V, a screw for moving it, a vertically-movable screw connected to the telescope to correct for abnormal refraction and resting upon said nut, and means for moving the latter screw lengthwise of the telescope to adjust the telescope for change of base.

11. In a range and position finder, the combination with a telescope pivotally mounted for movement in a vertical plane, of a support under the telescope, and means for adjusting said support longitudinally of the telescope to effect a definite change in the base of triangulation.

12. The combination with the pivoted support carrying the telescope, of a casing at the free end thereof having a scale on one side, a nut in said casing carrying an index for said scale, a screw for moving said nut longitudinally of the casing, and a support for said nut constructed to allow said longitudinal movement.

13. The combination with the telescope pivotally mounted to move in a vertical plane, the indicating-nut adjustable longitudinally of the telescope to change the base of triangulation, the vertical screw passing through said nut to correct for abnormal refraction and to furnish a support for said nut, the vertically-movable nut supporting said screw, and a screw for moving the latter nut to tilt the telescope.

Signed at New York, in the county of New York and State of New York, this 25th day of January, A. D. 1897.

ISAAC N. LEWIS.

Witnesses:
WM. H. CAPEL,
C. L. BELCHER.